UNITED STATES PATENT OFFICE.

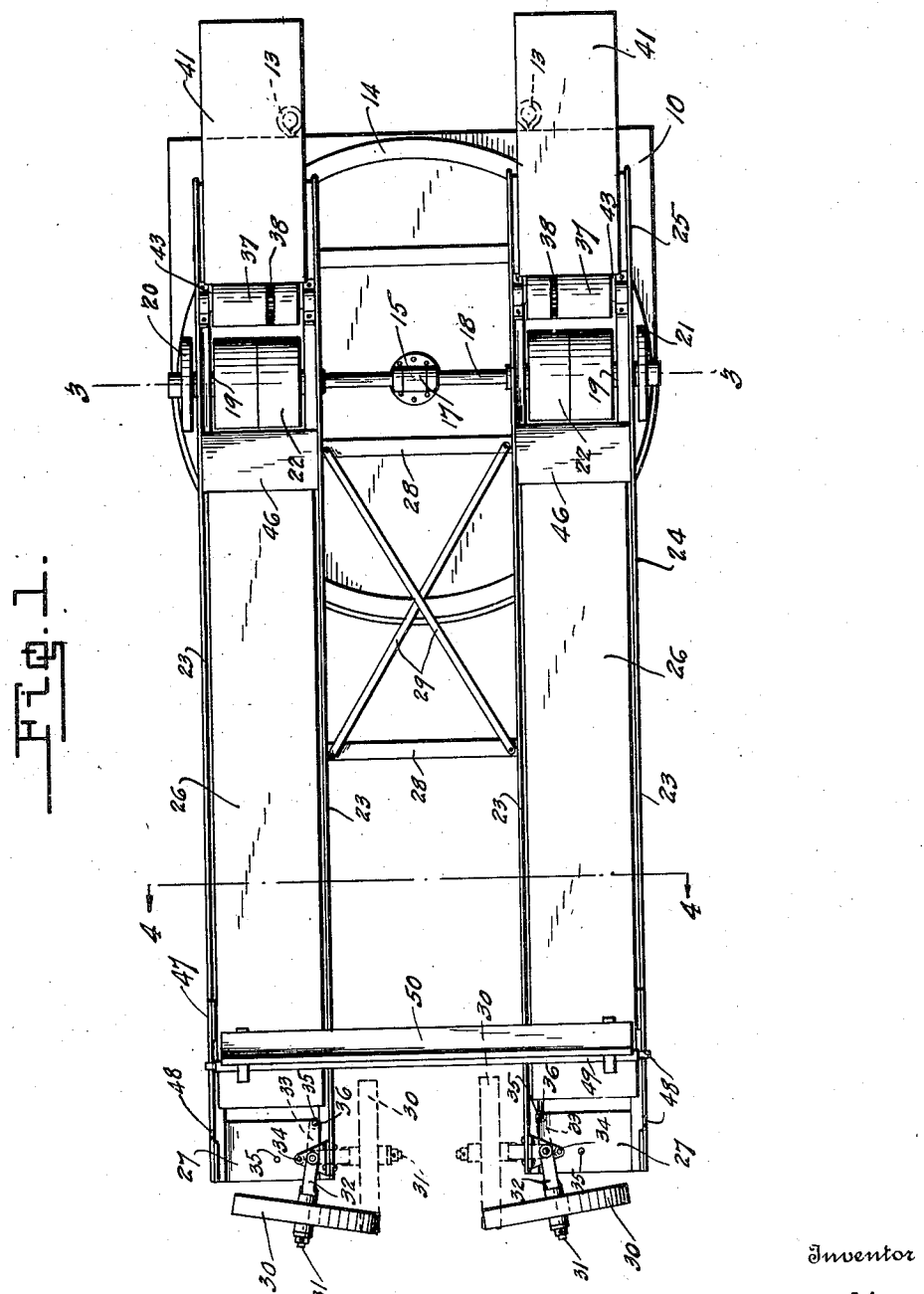

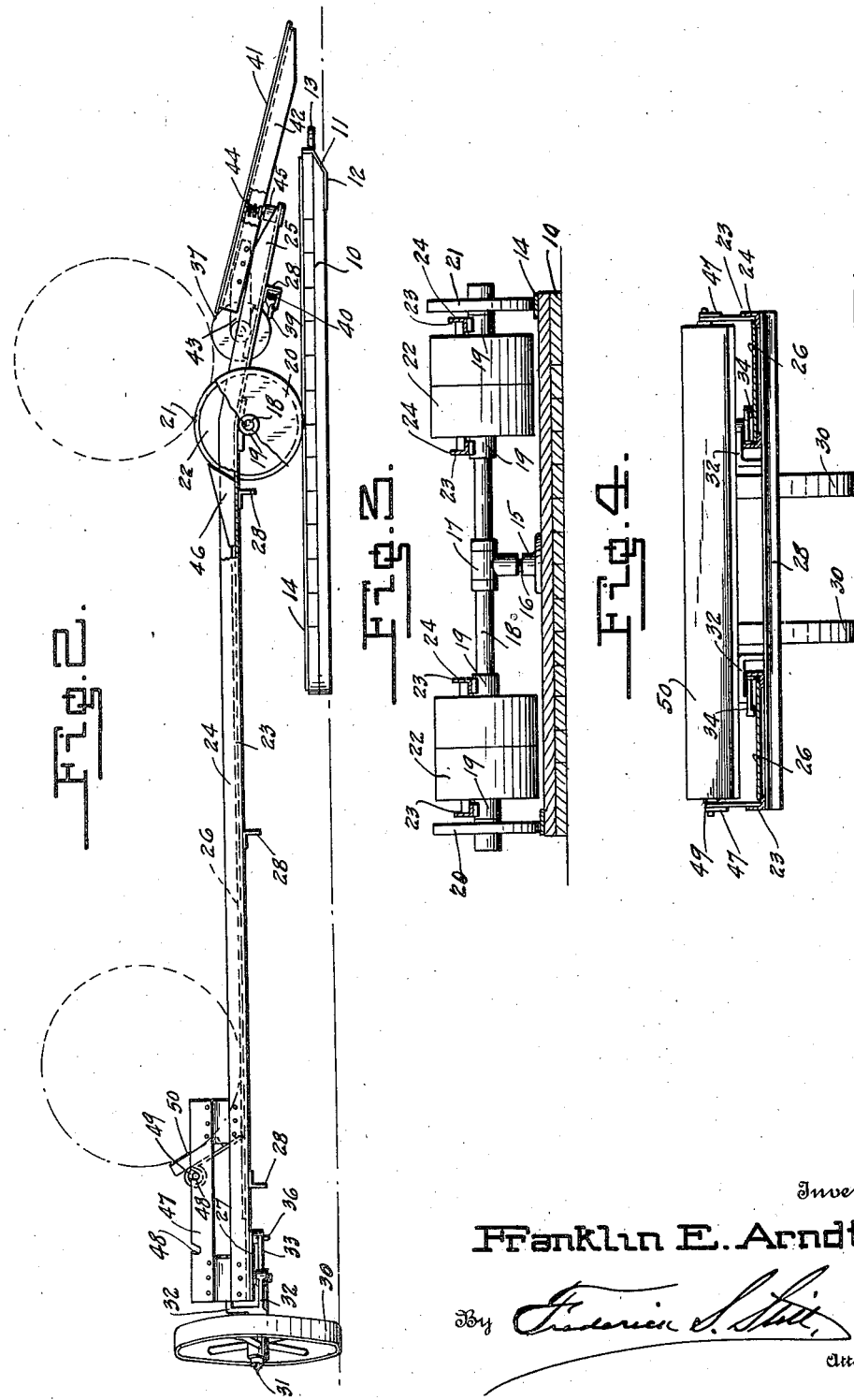

FRANKLIN E. ARNDT, OF GALION, OHIO, ASSIGNOR TO THE GALION IRON WORKS & MFG. CO., OF GALION, OHIO, A CORPORATION OF OHIO.

TRUCK TURNTABLE.

1,414,719.   Specification of Letters Patent.   Patented May 2, 1922.

Application filed February 20, 1922. Serial No. 538,058.

*To all whom it may concern:*

Be it known that I, FRANKLIN E. ARNDT, a citizen of the United States, residing at Galion, in the county of Crawford and State of Ohio, have invented certain new and useful Improvements in Truck Turntables, of which the following is a specification.

This invention relates to turntables for turning trucks, carts and the like, and particularly to a portable turntable such as used by street and highway building contractors and in constructing roads.

In the construction of roads and in many other situations, it often occurs that there is not room for a truck to turn and it is often desirable that the truck should back up to the work to discharge its load. This is often very difficult to accomplish, and the general object of the present invention is to provide a turntable which is adapted to be shifted by an automobile truck to the locality in which it is designed to be used and upon which automobile trucks may be run, the turntable then turning under the power of the truck to any desired point to permit the truck to discharge its load.

A further object of the invention is to provide a construction of this character having a supporting platform and a frame rotatable upon the platform and adapted to support the truck, this frame having wheels adapted to engage the ground at the free end of the frame to support the free end of the frame to permit it to rotate, the wheels being adjustable so as to be turned either into a position approximately at right angles to the axis of the frame to permit the frame to be rotated, or whereby the wheels may be turned into parallel relation to the axis of the frame to permit the frame to be hauled from or to any desired point.

A still further object is to provide a mechanism of this character wherein the rotatable frame constituting the turn table may be rotated under the power of the truck.

Another object is to construct and arrange this rotatable frame so that the portion of the frame remote from the rotative center of the frame supports but a small portion of the weight of the truck, the greater portion of the weight of the truck being rearward of the pivotal axis upon which the frame rotates, thus making it relatively easy for the frame to rotate upon its pivotal axis, even on an ordinary road.

Still another object is to provide a construction of this character wherein the greater portion of the turntable is not supported upon a circular track but upon the road itself, thus permitting a circular track of relatively small diameter to be used for supporting that portion of the frame adjacent the pivotal axis upon the supporting platform.

A further object is to provide an improved form of ramp or approach whereby the truck may ride up onto the frame of the turntable, these approaches or ramps being resiliently held normally with their rear ends out of contact with the ground so as not to touch the ground and, therefore, not impede the free rotation of the turntable under the power of the truck.

Still a further object is to provide improved means for blocking the truck when in place upon the frame and prevent the truck from backing off of the frame when exerting its power but permit the backing off of the truck whenever required.

Other objects have to do with the details of construction and arrangement of parts as will appear more fully hereinafter.

My invention is illustrated in the accompanying drawings, wherein:—

Figure 1 is a top plan view of a truck turntable constructed in accordance with my invention;

Figure 2 is a side elevation of a turntable partly broken away;

Figure 3 is a section on the line 3—3 of Figure 1;

Figure 4 is a section on the line 4—4 of Figure 1.

Referring to these drawings, 10 designates a platform, preferably formed of two layers of planks extending at right angles to each other, this platform at one end being upwardly inclined, as at 11, and having runners 12 and being provided with the eyebolts 13 whereby draft may be applied to draw the platform from place to place. This platform is designed to sit solidly upon the ground and have a width of approximately eight feet. Mounted upon the platform is a circular track 14 of any suitable character.

Mounted at the center of the platform is a support 15 having an upwardly extending pin 16, and rotatably mounted upon this pin is a bearing 17 which carries a transversely extending shaft 18, the outer end of this shaft being supported in bearings 19 carried by a supporting frame, said ends carrying wheels 20 and 21. The wheel 21 is keyed to the shaft but the wheel 20 is loose on the shaft. Keyed upon the shaft 18 adjacent the end bearings therefor are two pairs of flangeless wheels 22. These wheels 22 constitute rollers disposed adjacent each end of the shaft. Each roller is preferably made of two broad tread, flangeless wheels abutted against each other end to end for the reason that this is the most convenient way in order to form these relatively wide rollers.

The frame of the turntable comprises two pairs of angle irons 23, one pair of angle irons being on one side of the pivotal axis of the frame and the other on the opposite side, said angle irons being arranged with their flanges extending upward, as at 24. The bearings for the shafts 18 are carried by these angle irons and the angle irons rearward of the shaft are downwardly inclined, as at 25. Disposed between each pair of angle irons is a longitudinally extending steel plate 26 whose rear end is somewhat distanced from the adjacent roller 22 and whose forward end terminates short of the forward ends of the angle irons 23. A steel plate 27 extends across the forward ends of each pair of angle irons. The angle irons 23 are connected by transverse angular braces 28 and the two braces 28 which are forward of the shaft 18 are braced by cross braces 29. Obviously this construction might be varied in many ways without departing from the spirit of the invention.

Supporting the forward end of the frame formed of the angle irons 23 are the two wheels 30. These wheels are mounted upon spindles 31 having knuckles 32 which extend above and beneath the web or plate 27, each knuckle having a rearwardly extending arm 33. Each knuckle is supported by a bracket 34 which is riveted to the inside flange of the inner angle iron of each pair. The arm 33 is disposed beneath the plate 27 and this plate 27 is formed with apertures 35 and the arm 33 carries a pin 36 adapted to be inserted in one or the other of the apertures 35. When these wheels 30 are in the dotted line position in Figure 1 and the pins 36 have locked the wheels in this position, the wheels are in position for transporting the truck. When, however, the wheels are in a position with their spindles slightly convergent, as in the full line position in Figure 1, and the spindles are locked in this position, then the wheels are disposed tangentially to a circle whose center is the center of motion of the turntable, and in that case the wheels support the turntable frame for rotary movement around the axial center 15.

Rearward of the rollers 22 and mounted in bearings in the downwardly inclined portion of the frame are the idler rollers 37, these idler rollers being formed or carrying a ratchet 38, the teeth of which coact with a pawl 39. These teeth and the pawl are so arranged as to prevent counter-clockwise movement of the ratchet roller. The pawl is held in engagement with the ratchet by means of a spring 40 and each pawl is mounted upon a bracket attached to the rearmost transverse brace 28.

There are two approaches whereby the truck may run up on the turntable. Each approach is designated 41 and each approach has a width equal to the width of the idler rollers and drums. The plates which form the approach 41 are mounted upon angle irons 42 and the forward ends of these angle irons are riveted or otherwise attached to supporting beams 43, which in turn are pivoted upon the pins or trunnions of the idler rollers at each end thereof. The arms are disposed sufficiently inward of the angle irons constituting the frame and defining the tracks of the runway that the arms may be depressed, but the depression of the arms and of the approach members is resisted by compression springs 44 resting in sockets 45 and supported upon the rear ends of the longitudinal beams 24 of the frame in any suitable manner. These springs 44 support the rear ends of the approach members 41 off the ground, as illustrated in Figure 2, but when the front wheels of a truck abut against these raised approach members the weight of the front wheels will cause their depression so that the truck wheels can run up onto the idlers 37 and take a position between the idler rollers and the power rollers 22. Of course, the weight of the truck in backing off the turntable will also depress these approach members.

Disposed transversely in front of each of the power rollers 22 is a wooden block 46 whose upper face is downwardly and forwardly inclined and which is disposed contiguous to the power rollers so as to permit the front wheels of the truck to pass from the power rollers onto these inclined blocks 46 and so down onto the tracks constituted by the plates 28 and the angle irons 33, these blocks also, of course, permitting the front wheels to move upward into position to pass over the power rollers when the machine is backing off of the turntable.

In order to limit the forward movement of the truck upon the turntable, I attach to the lateral flanges of the outer angle irons 33 of the frame the longitudinally extending bars 47. The upper edges of these bars are formed with one or more downwardly and forwardly extending slots 48 and adapted to be disposed in these slots and extend transversely across the machine is a cross bar 49 formed of a piece of iron pipe or like material, the ends of which are reduced to slip into the slots 48. Carried by this iron pipe is a transversely extending plank 50 which acts as a chock to the front wheels of the truck. The bars 47 may be formed with a plurality of these slots 48 so that the chock may be adjusted for different lengths of trucks.

The method of using this mechanism will be obvious from what has gone before. By connecting the draft irons 13 to a tractor or other power operated truck, the forward end of the turntable may be lifted up so that the weight of the turntable will be supported by the rear wheels and its forward end by the tractor or draft truck. The wheels 30 are shifted to the dotted line position in Figure 1 and locked in this position by the pin 36, and then the turntable may be readily transported from one place to another. When carried to the location where it is to be used, the platform 10 is lowered onto the ground and the wheels 30 are shifted to the full line position in Figure 1 and locked in this position. Under these circumstances, the turntable may rotate around the axis of the supporting member 15 with the wheels 30 engaging the ground. Thus only a relatively small track 14 may be used for the turntable and this track is only used in order to prevent too great a strain upon the transverse shaft and upon the pivotal support therefor. When it is desired to use the turntable, the truck is driven up the approach members 41 and onto the tracks 26 until the power wheels take the position shown in dotted lines in Figure 2, resting upon the driving rollers 22 and upon the idler rollers 37. By this time the front wheels of the truck will be in the position shown in dotted lines in Figure 1 and the chocking plank 50 will then be put in place. By operating the automotive truck, the rear power wheels communicate their power to the power rollers and driving rollers 22 and the turntable will be rotated around its axial center to any desired position, when the truck may be readily backed off. When it is desired to back the truck off, the pawls 39 engaging the ratchet wheels 36 will prevent the rotation of the idler rollers 37 so that the rear wheels or power wheels of the truck will secure sufficient traction to cause the truck to back off. After the truck has discharged its load it may be returned upon the turntable and the turntable again operated to turn the truck around so that it may return whence it came.

Attention is called to one important feature of this construction, namely that the rear end or heaviest end of the truck is supported on the turntable rearward of the shaft 18. The rear end of the frame is disposed in spaced relation to the platform 10 and thus the weight of the rear end of the truck will act to lift or tend to lift the forward end of the turntable so that comparatively little of the weight of the truck or load is carried upon the wheels 30 and thus the turntable requires but a relatively small amount of power to be rotated. Where the turntable supporting frame is rotatably supported at its middle upon the circular track and upon the platform, the circular track has to be relatively large and the platform must be relatively long and wide in order to properly support the body of the turntable. By extending the frame of the turntable beyond the truck, however, and providing ground engaging wheels 30, a much smaller platform and smaller circular track may be used. When a truck is off the turntable, the turntable may be readily rotated manually to any desired position.

While I have illustrated an embodiment of my invention which has been found to be thoroughly effective in actual practice, it will be obvious that many changes might be made in the details of construction and arrangement of parts without departing from the spirit of the invention as defined in the appended claims.

I claim :—

1. A turntable comprising a frame rotatable around a vertical axis, the axis intersecting the frame adjacent one end of the frame, and means for supporting an automotive vehicle on the frame with the rear wheels thereof between said axis and the adjacent end of the frame to thereby cause the weight of the vehicle to tend to urge the opposite end of the frame upward.

2. A turntable comprising a frame rotatable around a vertical axis, said axis intersecting the frame adjacent one end of the frame, wheels supporting the other end of the frame and disposed approximately concentric to said axis, and means for supporting an automotive truck on the frame with the rear wheels thereof between said axis and the adjacent end of the frame.

3. A turntable of the character described comprising a frame rotatable around a vertical axis, said axis intersecting the frame adjacent one end, oppositely disposed supporting wheels for the frame disposed in transverse alignment with the axis of the frame, supporting wheels for the frame disposed at the end of the frame remote from said axis, said last named wheels being disposed approximately concentric to the axis, and means for holding an automobile truck upon the frame with its rear wheels disposed rearward of the pivotal axis.

4. A turntable of the character described comprising a frame rotatable around a vertical axis, said axis intersecting the frame adjacent one end, oppositely disposed supporting wheels for the frame disposed in transverse alignment with the axis of the frame, supporting wheels for the frame disposed at the end of the frame remote from said axis, said last named wheels being disposed approximately concentric to the axis, power rollers connected to said first named wheels and disposed in transverse alignment with the axis, and idler rollers disposed rearward of said power rollers.

5. A turntable of the character described comprising a frame rotatable around a vertical axis, said axis intersecting the frame adjacent one end, oppositely disposed supporting wheels for the frame disposed in transverse alignment with the axis of the frame, supporting wheels for the frame disposed at the end of the frame remote from said axis, said last named wheels being disposed approximately concentric to the axis, means for holding an automobile truck upon the frame with its rear wheels disposed rearward of the pivotal axis, and yieldingly raised approach members pivotally connected to the rear end of the frame.

6. A turntable of the character described including a ground engaging support, a frame including parallel wheel tracks, said frame being pivotally mounted on the support for rotation in a horizontal plane and extending beyond the support, and ground engaging wheels at one end of the frame and adapted to be disposed approximately concentric to the vertical axis of the frame.

7. A turntable of the character described including a ground engaging support, a frame including parallel wheel tracks, said frame being pivotally mounted on the support for rotation in a horizontal plane and extending beyond the support, and ground engaging wheels at the end of the frame shiftable into a position approximately concentric to the vertical axis of the frame or parallel to said tracks.

8. A turntable of the character described including a ground engaging support, a frame including parallel wheel tracks, said frame being pivotally mounted on the support for rotation in a horizontal plane and extending beyond the support, ground engaging wheels at the end of the frame shiftable into a position approximately concentric to the vertical axis of the frame or parallel to said tracks, and locking means for detachably holding said wheels in shifted position.

9. A turntable of the character described including a ground engaging support, a a frame pivotally mounted on the support for rotation in a horizontal plane and extending at one end beyond the support, ground engaging wheels at the latter end of the frame upon which said wheels are mounted, knuckles upon which said wheels are mounted, said knuckles causing the wheels to be shifted from a position approximately concentric to the vertical axis to a position parallel to the longitudinal axis of the frame, each of said knuckles having a perforated arm, members mounted upon the frame having perforations with which the perforated arm is adapted to register, and locking members disposed through said perforations and locking the wheels in adjusted position.

10. A turntable of the character described including a ground engaging support, a frame including parallel wheel tracks pivotally mounted on the support for rotation in a horizontal plane and extending beyond the support, ground engaging wheels at the end of the frame shifted into a position parallel to the longitudinal axis of the frame or approximately concentric to the vertical axis of the frame, locking means for said wheels, a circular track on the support, and oppositely disposed wheels disposed in radial alignment with the vertical axis of the frame and engaging said circular track.

11. A turntable of the character described including a ground engaging support, a frame pivotally mounted on the support for rotation in a horizontal plane and extending beyond the support, ground engaging supporting wheels at the end of the frame remote from its pivotal axis, a shaft carried by the frame and intersecting the pivotal axis, support engaging wheels mounted at the end of the shaft, power rollers mounted on the shaft, approach members pivotally connected to said frame and disposed in alignment with the power rollers, and means yieldingly urging the free ends of the approach members upward.

12. A turntable of the character described including a ground engaging support, a frame including parallel wheel tracks, the frame being pivotally mounted on the support for rotation in a horizontal plane and extending beyond the support, ground engaging wheels at the end of the frame remote from the vertical axis, a circular track on the support, a shaft carried by the frame and intersecting the vertical axis thereof, traction wheels mounted upon the shaft and engaging said circular track, power rollers on the traction wheels, idler rollers mounted rearward of the power rollers but adjacent thereto, releasable means for preventing rotation of the idler rollers in one direction but permitting free rotation in the opposite direction, approach members rearward of the idler rollers and pivotally supported at their forward ends on a level with the idler rollers, and means yieldingly supporting the rear ends of the approach members off of the ground.

13. A turntable comprising a rotatable truck supporting frame including longitudinally extending, parallel tracks, a power shaft carried by the frame and having power rollers and traction wheels, idler rollers disposed parallel to and adjacent the power rollers, inclined approach members extending from the tracks and leading to the idler rollers, and means for chocking the truck upon the turntable comprising longitudinally extending, parallel bars having downwardly and forwardly extending slots, a bar having its ends adapted to be received in said slots, and a member carried by the bar and acting as a chock.

14. A turntable of the character described including a platform adapted to rest upon the ground and having means at its rear end whereby it may be dragged and lifted, a frame pivotally mounted upon the platform for rotation in a horizontal plane, the forward end of the frame extending considerably beyond the platform and the rear end of the frame extending a relatively short distance beyond the pivotal center, wheels mounted upon the forward end of the frame and adapted to be shifted from a position parallel to the frame to a position approximately concentric to the axis thereof, means for holding said wheels in adjusted positions, and approach members pivotally connected to the rear end of the frame and extending beyond the platform.

15. A turntable of the character described, driving means arranged at the opposite sides for rotating the turntable in opposite directions, a pivotal support for the turntable adjacent one end, and ground engaging supporting wheels at the opposite end of the turntable.

16. A construction of the character described including a platform adapted to be supported upon the ground, a turntable pivotally mounted at one end upon said platform and extending beyond the platform, and means at the opposite end of the turntable from the pivotal support whereby this end of the turntable may be supported on the ground for movement of the turntable concentric to the pivotal axis thereof or in the direction of the longitudinal axis of the platform and with the platform.

17. A construction of the character described comprising a turntable, a pivotal support for the turntable adjacent one end, and ground-engaging supporting wheels at the opposite end of the turntable, the wheels being adjustable into a position approximately concentric to the pivotal axis of the turntable or parallel to the longitudinal axis of the turntable.

In testimony whereof I affix my signature.

FRANKLIN E. ARNDT.